(12) United States Patent
Menchicchi et al.

(10) Patent No.: US 11,125,114 B2
(45) Date of Patent: Sep. 21, 2021

(54) BASE PLATE FOR TURBOMACHINERY AND METHOD FOR PRODUCING SAME

(71) Applicant: Nuovo Pignone Tecnologie Srl, Florence (IT)

(72) Inventors: Marco Menchicchi, Florence (IT); Paolo Condello, Florence (IT); Emanuele Checcacci, Florence (IT); Domenico Zaffino, Florence (IT)

(73) Assignee: NUOVO PIGNONE TECNOLOGIE SRL, Florence (IT)

( * ) Notice: Subject to any disclaimer, the term of this patent is extended or adjusted under 35 U.S.C. 154(b) by 246 days.

(21) Appl. No.: 16/110,806

(22) Filed: Aug. 23, 2018

(65) Prior Publication Data
US 2019/0085729 A1    Mar. 21, 2019

(30) Foreign Application Priority Data

Sep. 20, 2017 (IT) .................. 102017000105273

(51) Int. Cl.
| F01D 25/28 | (2006.01) |
| F16M 1/04 | (2006.01) |
| F16M 5/00 | (2006.01) |

(52) U.S. Cl.
CPC .............. *F01D 25/28* (2013.01); *F16M 1/04* (2013.01); *F16M 5/00* (2013.01); *F05D 2220/32* (2013.01); *F05D 2230/21* (2013.01); *F05D 2230/232* (2013.01); *F05D 2230/60* (2013.01); *F05D 2240/91* (2013.01)

(58) Field of Classification Search
CPC ... F05D 2240/90; F05D 2240/91; F16M 5/00; F16M 1/04; F02C 7/20; F01D 25/28
See application file for complete search history.

(56) References Cited

U.S. PATENT DOCUMENTS

| 3,477,668 | A | * | 11/1969 | Tippmann | ................ | F16M 5/00 |
| | | | | | | 248/646 |
| 6,405,992 | B1 | | 6/2002 | Palmer | | |
| 2009/0013482 | A1 | * | 1/2009 | Kennedy | ................ | E01D 22/00 |
| | | | | | | 14/77.1 |
| 2015/0184591 | A1 | * | 7/2015 | Giancotti | ................ | F01D 25/28 |
| | | | | | | 60/798 |

FOREIGN PATENT DOCUMENTS

| DE | 10025129 A1 | * | 11/2001 | ............... F16M 5/00 |
| DE | 10025129 A1 | | 11/2001 | |
| GB | 2 445 740 A | | 7/2008 | |

OTHER PUBLICATIONS

Search Report and Opinion issued in connection with corresponding IT Application No. 102017000105273 dated May 7, 2018.
Extended European Search Report and Opinion issued in connection with corresponding EP Application No. 18193978.6 dated Feb. 1, 2019.

* cited by examiner

*Primary Examiner* — Ehud Gartenberg
*Assistant Examiner* — Jacek Lisowski
(74) *Attorney, Agent, or Firm* — Baker Hughes Patent Org.

(57) ABSTRACT

A turbomachine base plate is disclosed. The base pate includes an upper metal plate and a lower metal plate. The upper metal plate forms a turbomachine supporting surface. The base plate further includes an intermediate layer between the upper metal plate and the lower metal plate and bonded thereto. A frame extends peripherally around the intermediate layer.

15 Claims, 5 Drawing Sheets

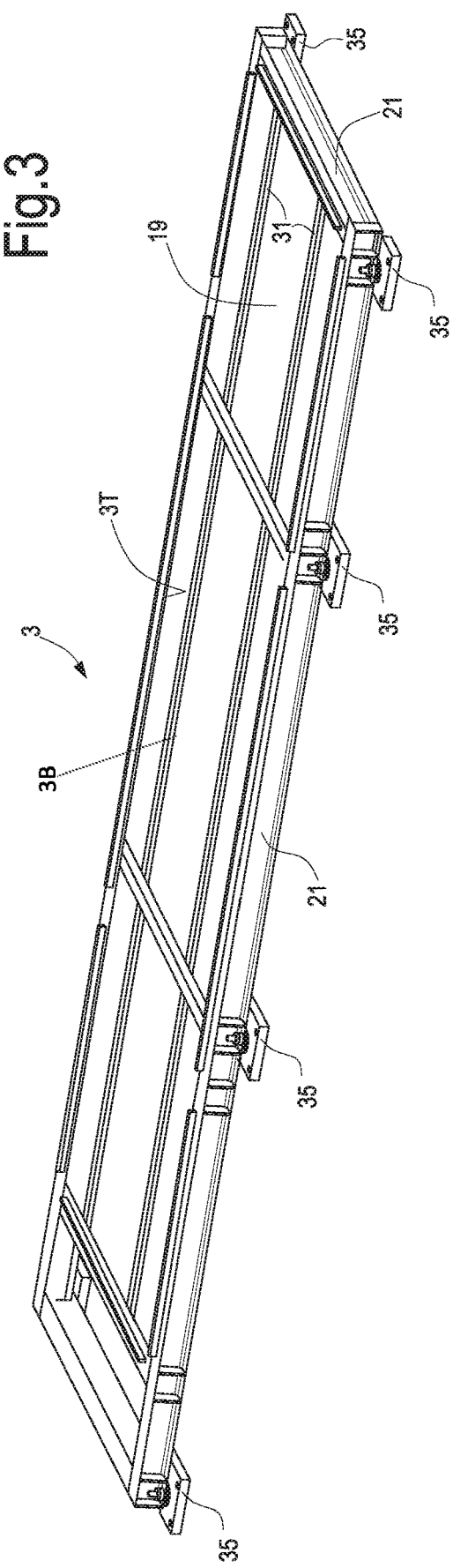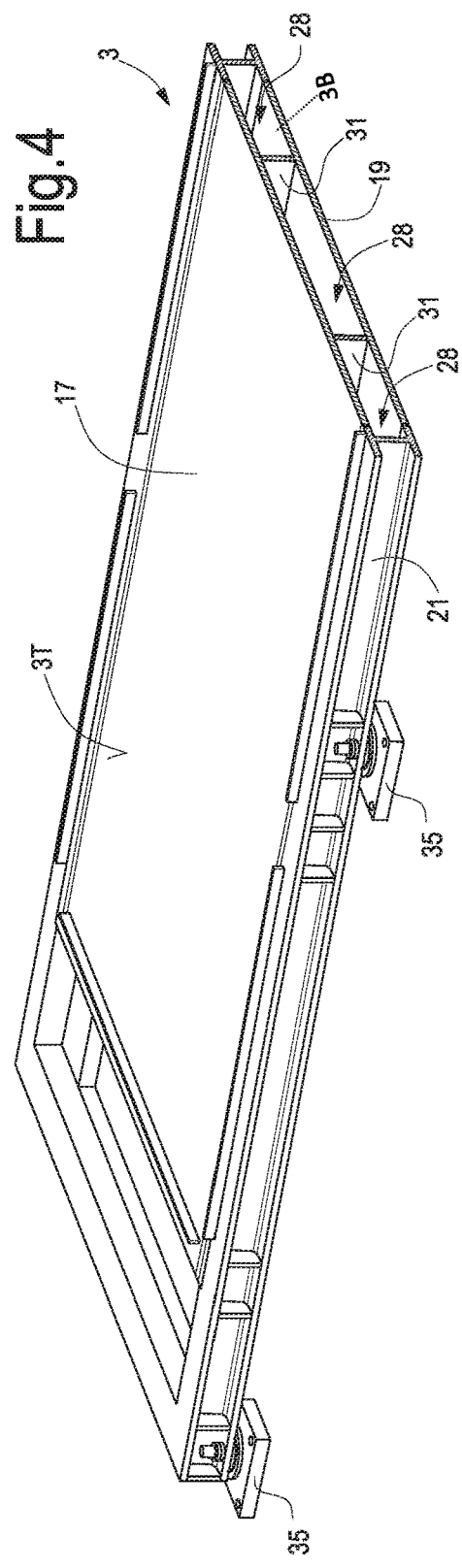

BASE PLATE FOR TURBOMACHINERY AND METHOD FOR PRODUCING SAME

FIELD OF INVENTION

The present disclosure relates to base plate structures for supporting turbomachines. Embodiments disclosed herein specifically refer to base plates for supporting gas turbine engines. The disclosure also relates to units or systems comprising at least a gas turbine engine and a base plate supporting said gas turbine engine, as well as to methods for manufacturing the base plate.

BACKGROUND OF THE INVENTION

Gas turbine engines are widely used as prime movers in several industrial applications. In power generation applications, gas turbine engines are for instance used to drive electric generators for producing electrical power. In mechanical drive applications, gas turbine engines are used to drive a rotary load, for instance a gas compressor or a train of gas compressors.

A gas turbine engine is usually mounted on a base plate, which shall provide sufficient load capability, flexural efficiency and torsional strength. Turbomachine base plates of this kind are usually comprised of a lattice structure, formed by a plurality of beams welded to one another. A labor-intensive welding process is required to connect the beams to one another. Weld beads are located on the top, on the bottom as well as across the whole thickness of the base plate, also in locations which are difficult to reach. All this makes the welding process particularly time consuming and expensive.

The rotary machines are supported on flanges of intermediate beams of the lattice structure. The design of the lattice structure poses therefore limitations and constraints as to the possible positioning of the machinery on the base plate. Conversely, the position of the beams forming the lattice structure, and therefore the mechanical properties thereof, are made conditional upon the position where the rotary machines must be placed.

All the beams forming the lattice structure must be painted for protection against atmospheric agents. The lattice structure complexity, the large number of beams forming the lattice structure and the limited access to the interior of the base plate structure render the painting operation labor intensive and time consuming, adding to the total cost of the final base plate structure.

The upper side of the base plate must be provided with closing plates, to close the openings formed by the lattice structure. Plates are subject to vibrations induced by the operation of the gas turbine engine, and/or possible other rotating machines mounted on the base plate. This generates noise. Noise damping equipment is requested around the base plate and the gas turbine engine enclosure.

Several pieces of ancillary equipment are arranged within the vertical extension of the base plate, to exploit the space available between the top surface and the bottom surface of the base plate. Access to such equipment is difficult.

To provide sufficient flexural and torsional strength, the height of the lattice structure must be substantial. For instance, gas turbine engines having a power rate up to 50 MW usually require base plates having a vertical dimension (i.e. a thickness) of around 600-700 mm. This renders the base plate cumbersome, heavy to transport and expensive. The flexural and torsional strength of the base plate structure heavily depends upon the vertical extension (height) of the structure.

A need therefore exists to provide a more efficient base plate for supporting rotary turbomachines, such as in particular gas turbine engines, and possible auxiliary equipment or rotary loads connected thereto, which alleviates or overcomes at least one or some of the above mentioned limitations and drawbacks of the base plate structures of the current art.

SUMMARY OF INVENTION

According to one aspect, a turbomachine base plate is disclosed, comprising an upper metal plate forming a turbomachine supporting surface and a lower metal plate. An intermediate layer made of a filling material is arranged between the upper plate and the lower plate and is bonded to the inner surfaces of the upper and lower metal plates, as well as to a frame extending peripherally around the intermediate layer.

According to some embodiments, the intermediate layer is made of a hardened flowable material. A "flowable material" as understood herein is a material which can be in fluid, semi-fluid or powder form, for instance, and more in general a material which can be poured into the closed volume formed between the frame and the upper and lower metal plates. The flowable material is then hardened and caused to adhere to the inner surfaces of the upper and lower metal plates, as well as to the inwardly oriented surfaces of the frame. The flowable material can be an expandable material, e.g. a polymer foam, or a metal foam or a ceramic foam. Expansion of the foam material can efficiently fill the entire inner volume of the base plate structure, between the upper and lower metal plates and the surrounding frame.

The turbomachine base plate can be provided with anchoring points, for anchoring the base plate to a supporting structure. The anchoring points can be provided along or formed by the frame.

The upper metal plate and/or the lower metal plate can have a thickness in the range of about 1 to about 50 mm.

In some embodiments, the intermediate layer has a thickness in the range of about 100 to about 1500 mm.

According to a further aspect, a turbomachine system is disclosed, comprising a gas turbine engine mounted on a turbomachine base plate as described above.

Also disclosed herein is a method for producing a turbomachine system, comprising introducing a flowable material in a hollow volume of a base plate structure, the hollow volume formed among an upper metal plate, a lower metal plate and a frame extending peripherally along edges of the upper metal plate and the lower metal plate. The method can further comprise causing the flowable material to set and adhere to the upper metal plate, the lower metal plate and the frame.

Features and embodiments are disclosed here below and are further set forth in the appended claims, which form an integral part of the present description. The above brief description sets forth features of the various embodiments of the present invention in order that the detailed description that follows may be better understood and in order that the present contributions to the art may be better appreciated. There are, of course, other features of embodiments of the invention that will be described hereinafter and which will be set forth in the appended claims. In this respect, before explaining several embodiments of the invention in details, it is understood that the various embodiments of the invention are not limited in their application to the details of the construction and to the arrangements of the components set forth in the following description or illustrated in the drawings. Embodiments of the invention are capable of being practiced and carried out in various ways. Also, it is to be understood that the phraseology and terminology employed herein are for the purpose of description and should not be regarded as limiting.

As such, those skilled in the art will appreciate that the conception, upon which the disclosure is based, may readily be utilized as a basis for designing other structures, methods, and/or systems for carrying out the several purposes of embodiments of the present invention. It is important, therefore, that the claims be regarded as including such equivalent constructions insofar as they do not depart from the spirit and scope of embodiments of the present invention.

BRIEF DESCRIPTION OF THE DRAWINGS

A more complete appreciation of the disclosed embodiments of the invention and many of the attendant advantages thereof will be readily obtained as the same becomes better understood by reference to the following detailed description when considered in connection with the accompanying drawings, wherein:

FIG. 3 illustrates a perspective view of a portion of the base plate;

FIG. 4 illustrates a sectional perspective view of a portion of the base plate;

DETAILED DESCRIPTION

The following detailed description of the exemplary embodiments refers to the accompanying drawings. The same reference numbers in different drawings identify the same or similar elements. Additionally, the drawings are not necessarily drawn to scale. Also, the following detailed description does not limit embodiments of the invention. Instead, the scope of embodiments of the invention is defined by the appended claims.

Reference throughout the specification to "one embodiment" or "an embodiment" or "some embodiments" means that the particular feature, structure or characteristic described in connection with an embodiment is included in at least one embodiment of the subject matter disclosed. Thus, the appearance of the phrase "in one embodiment" or "in an embodiment" or "in some embodiments" in various places throughout the specification is not necessarily referring to the same embodiment(s). Further, the particular features, structures or characteristics may be combined in any suitable manner in one or more embodiments.

In general terms, to provide a better base plate, with improved characteristics, the common lattice structure is replaced by a sandwich structure, comprised of a top metal plate and a bottom metal plate. An intermediate layer of a filling material, in an embodiment, comprised of a polymer, is arranged between the top metal plate and the bottom metal plate. The filling material adheres to the upper and lower metal plates, thus providing a compound structure having an improved flexural and torsional strength. The intermediate filling material can be comprised of a foamed or unfoamed polymer. A peripheral frame can surround the base plate and delimit an inner volume of the base plate, together with the upper metal plate and lower metal plate. The filling material is poured in the inner volume when still in a flowable state. Once poured in the inner volume of the base plate, the filling material can be caused to set and adhere to the inner surfaces of the frame and of the upper and lower metal plates, such that a substantially monolithic sandwich structure is obtained.

The base plate thus obtained has a low weight and enhance mechanical strength, does not require welding and is thus easier to manufacture. Painting is limited to the external surfaces of the frame and metal plates, while the inner surfaces are protected against environmental agents by the set filling material.

Figure 1:
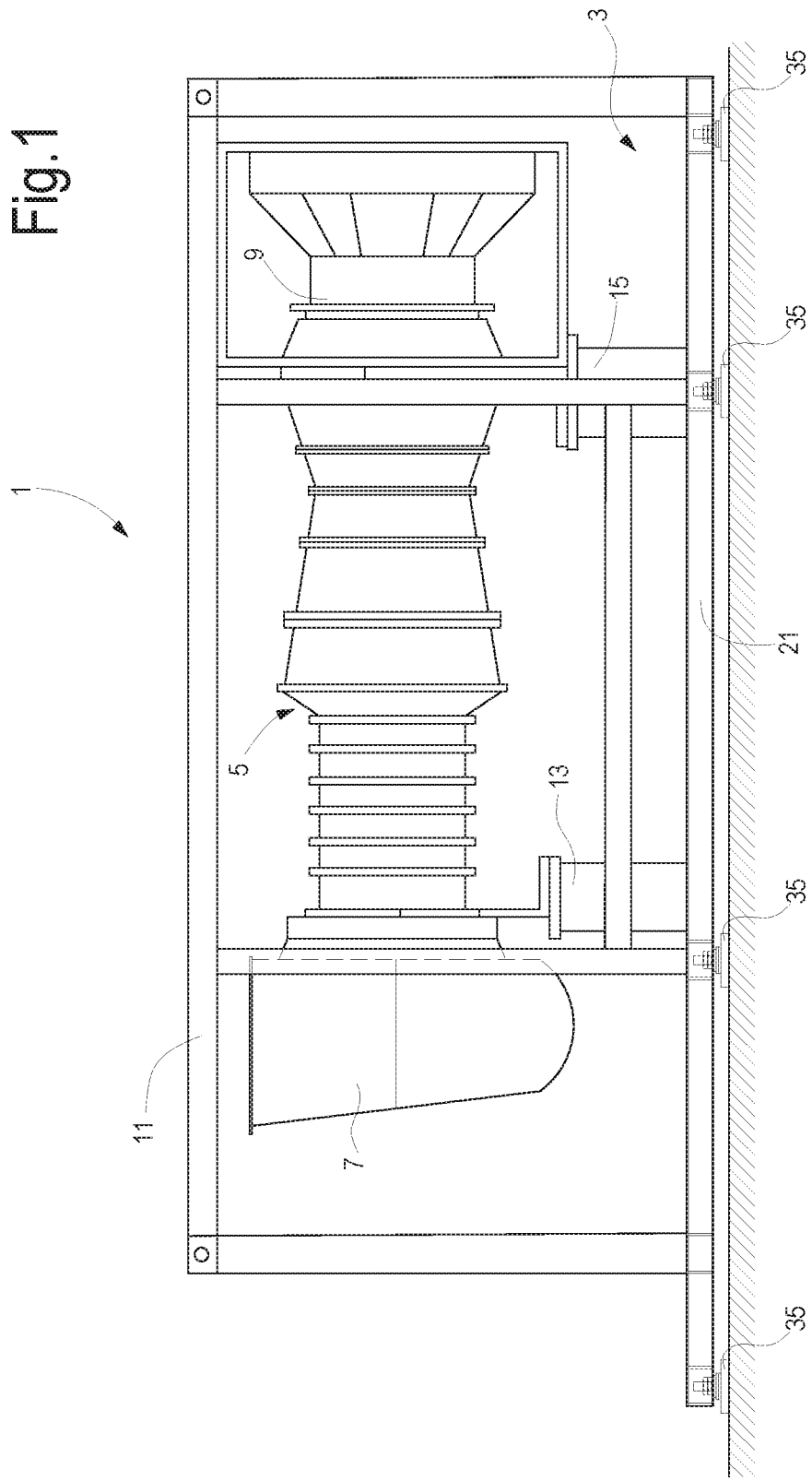
FIG. 1 illustrates a side view of a system comprising a gas turbine engine and a base plate.
Figure 2:
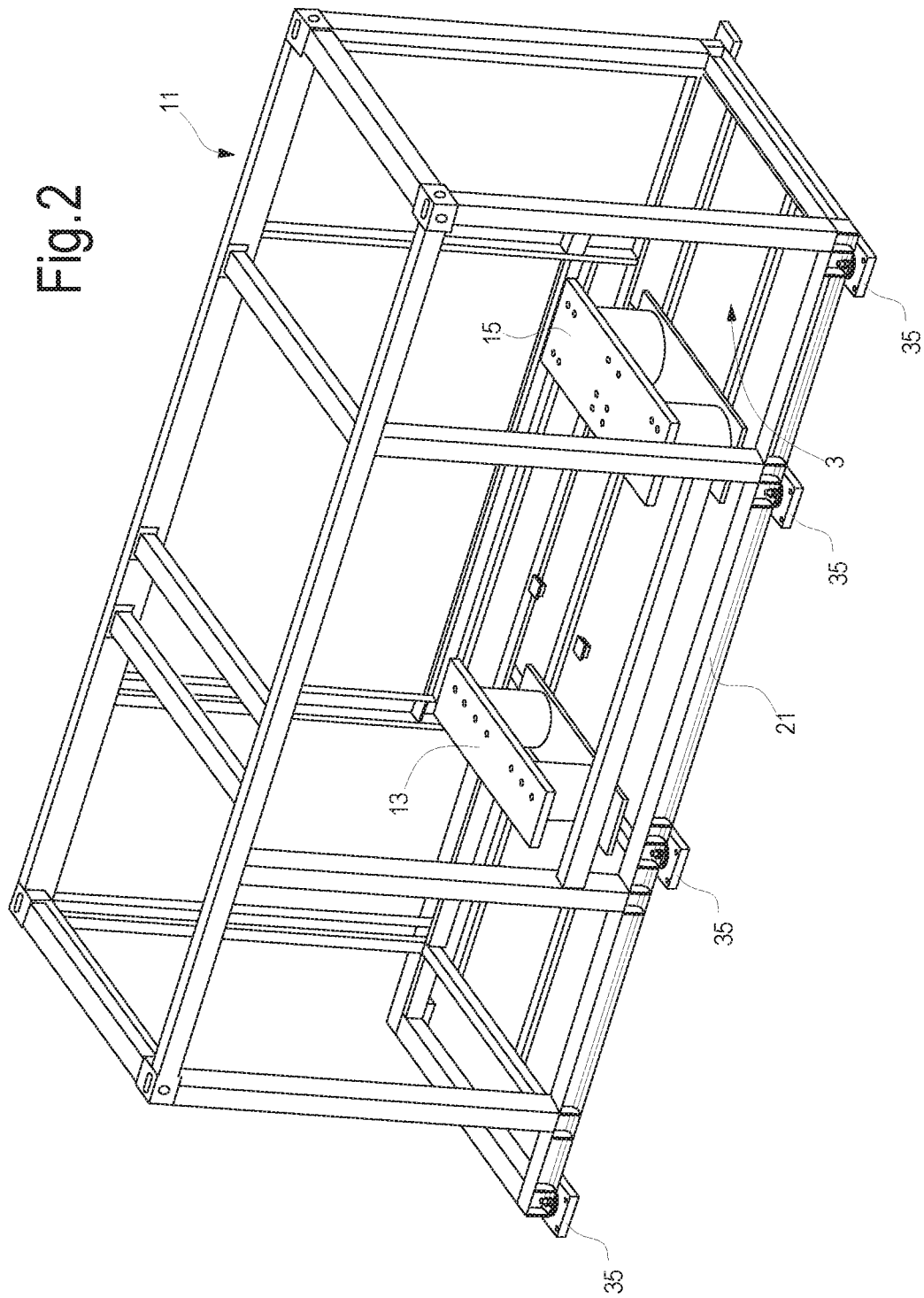
FIG. 2 illustrates a perspective view of the system of FIG. 1 with the gas turbine engine removed.

Turning now to the accompanying drawings, FIG. 1 illustrates a side view of a system 1 comprising a base plate 3 and a gas turbine engine 5 mounted on the base plate 3. The gas turbine engine 5 can be for instance an aeroderivative gas turbine engine, and can be drivingly coupled to an electric generator, a gas compressor or any other rotary load, not shown. In some instances, the rotary load can be mounted on the same base plate 3. In other embodiments, the load may be arranged on a separate base plate.

In some embodiments, the gas turbine engine 5 can be comprised of an inlet plenum 7 and an exhaust gas diffuser 9.

The gas turbine engine 5 can be contained in a gas turbine enclosure, partly shown at 11.

The gas turbine engine 5 and the enclosure 11, if provided, are mounted on the base plate 3. Intermediate gas turbine supporting elements 13, 15 can be constrained to the base plate 3 and upwardly projecting therefrom. The gas turbine supporting elements 13, 15 are known per se. They may define a 3-points supporting arrangement, providing an isostatic link between the gas turbine engine 5 and the base plate 3.

The base plate 3 is shown in isolation and in partial section in FIG. 3. The base plate 3 can comprise a top or upper surface 3T and a bottom or lower surface 3B. As used herein, the terms "top" and "bottom" are referred to the arrangement of the base plate in its operative position. The top surface 3T can be formed by an upper metal plate 17 and the bottom surface 3B can be formed by a lower metal plate 19. Each metal plate 17, 19 can be monolithic, i.e. can be formed by a single sheet of metal. In other embodiments, one or both said metal plates 17, 19 can be formed by a plurality of separate plate portions or partial plates, which are welded to one another along abutting edges thereof, to form a single metal plate.

Between the upper metal plate 17 and the lower metal plate 19 a frame 21 is provided, which extends peripherally around the base plate 3, as can best be seen in FIGS. 3 and 4. The frame 21 can be quadrangular and can be substantially co-extensive with the upper metal plate 17 and the lower metal plate 19. The frame 21 can be formed by beam portions. As will be described in greater detail later on, the beams forming the frame 21 may take various cross sectional shapes. In general the beams forming the frame 21 can have a central web and two flanges, an upper flange and a lower flange, respectively.

The upper metal plate 17 can be welded along the frame 21 on the upper side thereof, and the lower metal plate 19 can be welded along the frame 21 on the lower side thereof, such that a substantially closed structure is obtained, comprised of the frame 21 and the upper and lower metal plates 17, 19 welded thereto.

As will be appreciated by those skilled in the art, the amount of welding in the above disclosed structure is substantially less than the welding required to manufacture a base plate having a lattice structure according to the current art.

Figure 6A:
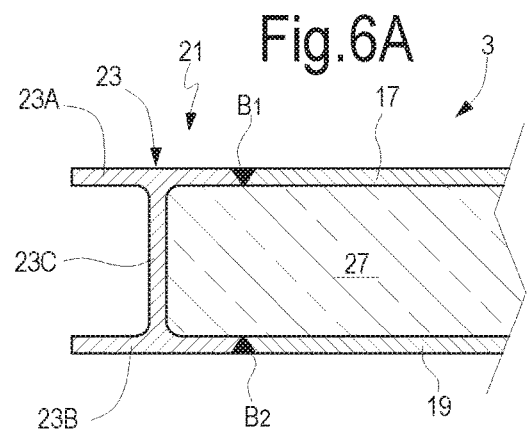
FIGS. 6A, 6B, 6C, 6D illustrate sectional views of alternative shapes of the beams forming the frame of the base plate.

In some embodiments, the frame 21 can be formed by sections or portions of a beam 23 having an H-shaped cross section, as shown by way of example in FIG. 6A. The beam 23 comprises an upper flange 23A, a lower flange 23B and a central web 23C. The upper metal plate 17 is welded along an inwardly oriented edge of the upper flange 23A. The lower metal plate 19 is welded along an inwardly oriented edge of the lower flange 23B. B1 and B2 designate welding beads. The welding beads B1 and B2 can be continuous.

Figure 6B:
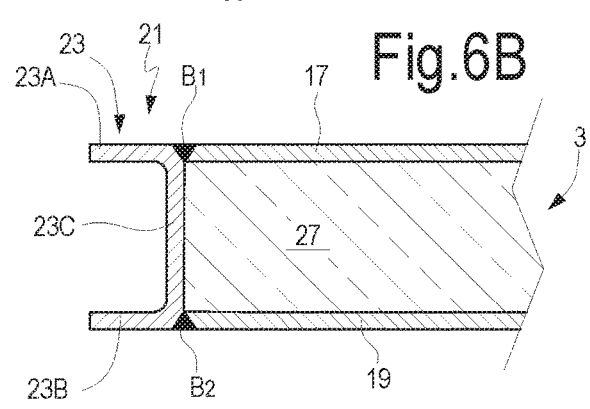

In other embodiments, the frame 21 can be formed by sections or portions of a beam having a C-shaped cross section, as shown in FIG. 6B. The same reference numbers designate the same or corresponding parts as in FIG. 6A. In the embodiment of FIG. 6B, the beam 23 is arranged such that the upper and lower flanges 23A, 23B thereof project outwardly from the base plate 3. The web 23C faces the interior of the base plate 3 and the upper and lower metal plates 17, 19 are welded along weld beads B1 and B2 along the upper and lower edges of the beam, at the web 23C thereof.

Figure 6C:
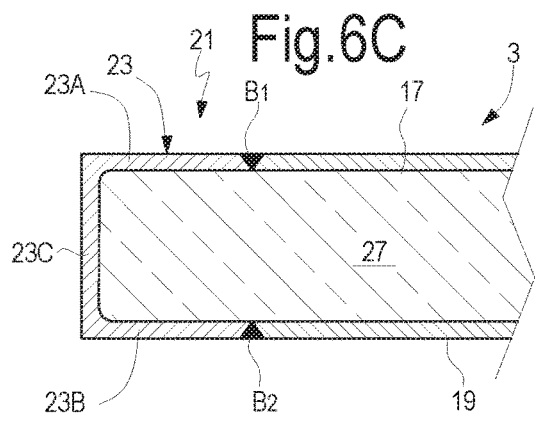

FIG. 6C shows a cross-sectional view of a further embodiment of the frame 21, wherein the beams 23 forming the frame 21 have again a C-shaped cross section, but the flanges 23A, 23B thereof are facing inwardly. The upper metal plate 17 and lower metal plate 19 are welded to the frame 21 along the free edges of the flanges 23A, 23B. References B1 and B2 again designate the welding beads.

Figure 6D:
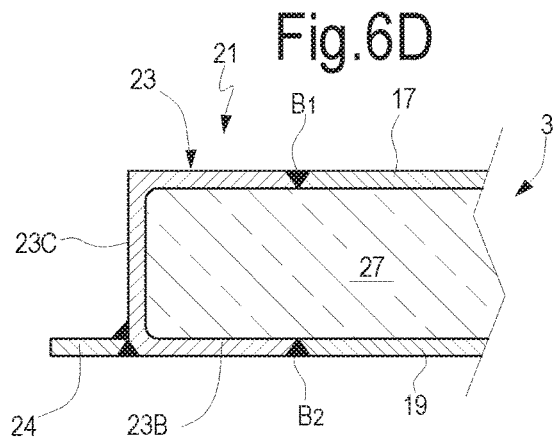

FIG. 6D shows a cross-sectional view of a further embodiment of the frame 21, wherein the beams 23 have a C-shaped cross section, and a flange 24 projecting outwardly of the frame has been added by welding.

The metal plates 17, 19 and the frame 23 enclose an inner space 28 (FIG. 4), which is filled with a filling material, forming an intermediate layer 27 (FIG. 6), which can be surface-bonded to the upper metal plate 17, to the lower metal plate 19 and to the frame 21. In FIG. 4 the inner space 28 is shown as an empty volume prior to filling with the filling material. The intermediate layer 27 formed by the filling material can take up the entire empty volume 28 (FIG. 4), bounded by upper and lower metal plates 17, 19 and surrounded by the frame 21.

In some embodiments, the intermediate layer 27 can be comprised of or made of a polymer or a plastic. In some embodiments, the polymer can be a thermosetting polymer. For instance, the intermediate layer 27 can be comprised of or made of an elastomer, for instance an unfoamed elastomer. According to exemplary embodiments disclosed herein, the polymer can be an unfoamed polyurethane.

According to further embodiments, the intermediate layer 27 can be comprised of or formed of a foamed polymeric resin, such as a thermosetting polymeric resin. Exemplary embodiments of materials, whereof the intermediate layers can be made of, can be selected from the group consisting of: open cell polyurethane, closed cell polyurethane, polyisocyanurate, polystyrene.

In other embodiments, the filling material forming the intermediate layer 27 can be a non-polymeric foam. In exemplary embodiments, the intermediate layer 27 can be comprised of or made of a metal foam, such as aluminum foam. In further embodiments, the intermediate layer 27 can be comprised of or made of a ceramic foam, such as an aluminum oxide foam.

The filling material forming the intermediate layer 27 can be poured in a flowable form, for instance in a liquid, semi-liquid, or powder form, or in a foamed form, in the inner space 28 of the base plate, once the metal plates 17, 19 and the frame 21 have been welded to one another, thus forming a closed structure. Suitable apertures, not shown, can be provided in one of the upper and lower metal plates 17, 19, in an embodiment, in the upper metal plate 17, for introducing the flowable filling material.

The flowable filling material can be for instance an uncured polymeric resin having a sufficiently low viscosity, such that the polymeric resin can easily distribute in the inner volume of the base plate defined between upper and lower metal plates 17, 19 and frame 21. The polymeric resin can then be caused to cure and solidify. If foamed resin is used, the non-polymerized resin will expand once poured into the inner volume of the base plate and will expand until the whole inner volume is filled with expanded polymeric resin.

In general, the filling material in flowable form is introduced into the empty cavities of the base plate 3 and caused to harden.

The curing or hardening process will cause adhesion of the intermediate layer 27 to the inner surfaces of the upper metal plate 17 and of the lower metal plate 19, as well as to the inwardly oriented surfaces of the peripherally arranged frame 21.

The apertures provided for pouring the flowable filling material in the interior of the base plate 3 can be closed, if needed, e.g. by welding, once the flowable material has been introduced into the inner space 28 of the base plate 3.

Once the curing or hardening process has been completed, the surfaces of the beams 23 forming the frame 21 as well as the lower surface of the upper metal plate 17 and the upper surface of the lower metal plate 19 are in intimate contact with the filling material forming the intermediate layer 27, which provides a coating for the metal surfaces of the metal plates 17, 19 and of the frame 21. Internal painting of the surfaces of the frame 21 and of the metal plates 17, 19 is not required, since the hardened filling material provides sufficient protection against atmospheric agents or any other potentially harmful agent.

Figure 7:
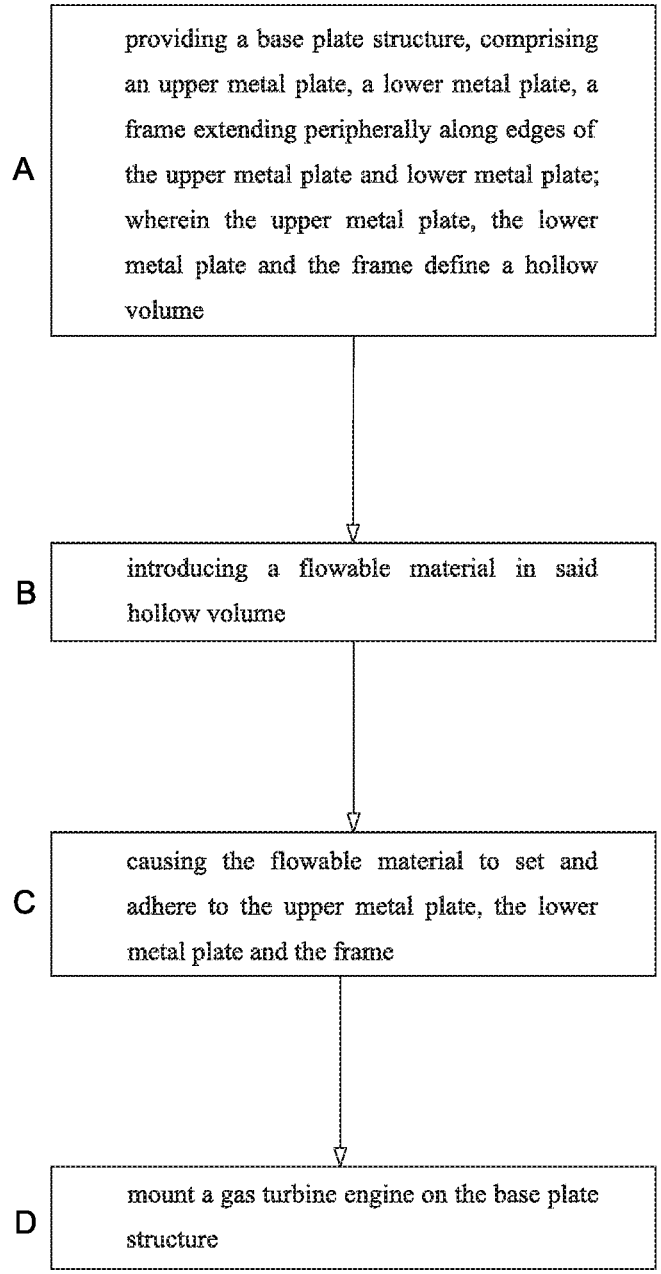
FIG. 7 illustrates a flow chart summarizing a method of manufacturing the base plate.

FIG. 7 illustrates a flow chart summarizing steps of the manufacturing method described above, labeled as A-D on the flow chart.

Additionally, the hardened filling material provides structural strength to the base plate 3. The sandwich structure formed by the upper and lower metal plates 17, 19, the frame 21 and the intermediate layer 27 provides a cross section having a high moment of inertia. A high torque and flexural strength is obtained, as the intermediate layer 27 adheres to the upper and lower metal plates 17, 19, such that tangential forces are transmitted by the intermediate layer 27 to the upper and lower plates 17, 19. The moment of inertia of the cross section of the base plate 3 is thus provided by the entire solid area of the cross section, rather than by the upper and lower flanges of the beams, only, as in the base plates of the current art. The same torque and flexural strength can be obtained with a lower thickness (vertical dimension) of the base plate 3, compared with a base plate of the current art having a lattice structure. A base plate 3 according to the present disclosure can achieve performances, in terms of flexural and torsional strength, comparable with those of a current art base plate, which is triple as thick.

The filling material of the base plate forming the intermediate layer 27 has a specific weight lower than metal, such that a relatively light structure is obtained. If a foamed filling material is used, e.g. a polymeric foam or a metal foam, the overall weight of the base plate is further reduced.

The intermediate layer 27 provides mechanical strength to compression and crushing, such that the turbomachine supporting elements 13, 15 can be arranged in any position along the upper surface of the top or upper metal plate 17, without the need for beams being arranged underneath the supporting elements 13, 15. Thus, in some embodiments the inner volume of the base plate 3 can be entirely filled with the filling material.

Additionally, according to some embodiments, the intermediate layer 27 provides vibration dampening. Since the upper and lower metal plates 17, 19 nare bonded to the intermediate layer 27, vibrations of the base plate structure generated by the rotary machinery placed thereon are efficiently dampened, which effectively reduces noise. According to embodiments disclosed herein, particularly effective vibration dampening can be achieved if the filling material is a polymeric material, and specifically a foamed polymeric material. Additional noise banters may be dispensed with, in some cases at least.

In some embodiments, one or more additional beams can be arranged in the inner space 28 of the base plate 3. In FIG. 4, for instance, two intermediate beams 31 are provided. The intermediate beams 31 can have the same cross section as the beams forming the frame 21, or a different cross section. For instance, in FIG. 4 all beams have an H-shaped cross section, but this is not mandatory.

The intermediate beam(s) 31 can be arranged parallel to the longer sides or to the shorter sides of the quadrangular frame 21. In the embodiment of FIG. 4 the intermediate beams 31 are parallel to the longer sides of the frame 21 and the ends thereof can be welded to the beams forming the shorter sides of the frame 21.

In some embodiments, the upper and/or lower metal plates 17, 19 can be made of separate metal sheet portions, which can be welded along edges thereof to the upper and lower flanges of the intermediate beams 31.

The intermediate beams 31 can provide improved mechanical strength to the base plate 3. In some embodiments, intermediate beams 31 can enhance distribution of the flowable filling material, which is introduced into the inner space 28 of the base plate 3. The intermediate beams 31 can also divide the inner volume 28 into separate compartments, which can be filled with the same or with different kinds of filling materials, if so required or desired.

Figure 5:
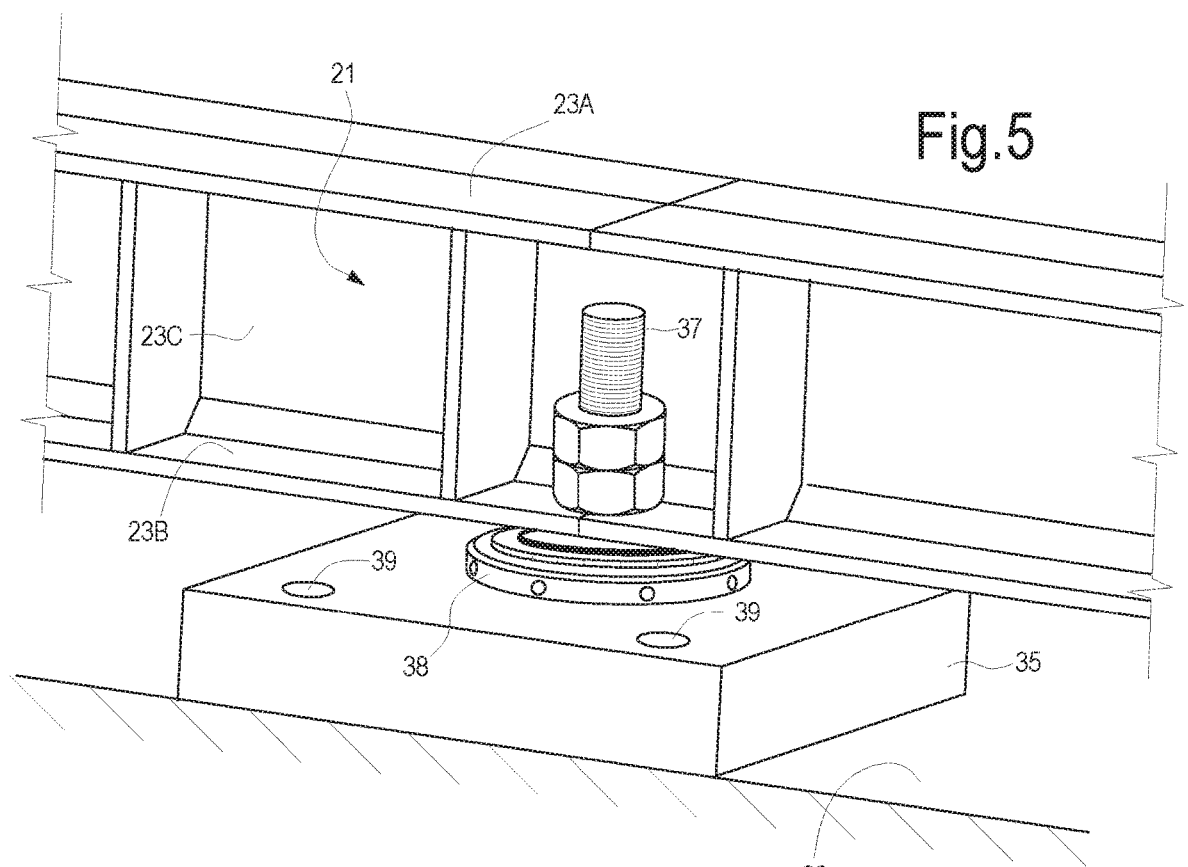
FIG. 5 illustrates a detail of an anchoring member for anchoring the base plate to a supporting structure.

The base plate 3 can further be provided with anchoring members for connection to a supporting structure 33, see FIG. 5. The supporting structure 33 can be for instance a foundation block made of concrete. As shown in FIGS. 3 and 5, a plurality of feet 35 is distributed along the periphery of the base plate 3. In some embodiments, the feet 35 can be located partially under the lower flange 23B of the respective frame beam 23. A respective screw stud 37 can be used to fasten each foot 35 to the base frame 3. In the exemplary embodiment of FIGS. 3, 5 the screw stud 37 extends through a hole provided in the lower flange 23B of the frame beam 23.

In other embodiments, as shown in FIG. 6D, an external flange 24 can be welded to the beam 23 and each foot 35 can be fastened to the external flange 24.

Each foot 35 can be provided with through holes 39, through which screwed anchoring bolts extending from the foot 35 can be inserted and blocked by means of nuts or the like.

According to some embodiments, the base plate 3 can be anchored to a supporting structure 33 as follows. The base plate 3 is placed on top of the supporting structure 33 with the feet 35 contacting the upper surface of the supporting structure 33. Dead holes are drilled in the supporting structure using the feet 35 and the through holes 39 thereof as templates. Threaded anchoring bolts can thereafter be partly introduced and fastened in the dead holes thus formed in the supporting structure 33. Anchoring can be through chemical anchor fasteners. Once the chemical fastener is set, the feet 35 are fastened to the anchoring bolts by means of screw nuts. Shimming means 38 can be provided between the frame 21 of the base plate 3 and the feet 35, for levelling the base plate 3.

Thus, the following structure is obtained: a supporting structure 33 on which the base plate 3 is arranged, with the feet 35 contacting the upper surface of the supporting structure 33. Threaded anchoring bolts are fastened in the dead holes by chemical fasteners and extend outside the dead holes and through the through holes 39 of the feet 35. Screw nuts screwed on the threaded anchoring bolts retain the feet 35 of the base plate 3 on the supporting structure 33. Shimming means 38 located between the frame 21 of the base plate 3 and the feet 35 ensures the base plate 3 is horizontal.

While the disclosed embodiments of the subject matter described herein have been shown in the drawings and fully described above with particularity and detail in connection with several exemplary embodiments, it will be apparent to those of ordinary skill in the art that many modifications, changes, and omissions are possible without materially departing from the novel teachings, the principles and concepts set forth herein, and advantages of the subject matter recited in the appended claims. Hence, the proper scope of the disclosed innovations should be determined only by the broadest interpretation of the appended claims so as to encompass all such modifications, changes, and omissions. In addition, the order or sequence of any process or method steps may be varied or re-sequenced according to alternative embodiments.

The invention claimed is:

1. A turbomachine system comprising a gas turbine engine mounted on a turbomachine base plate, comprising:
   an upper metal plate having a top surface forming a turbomachine supporting surface and a bottom surface opposite the top surface;
   a lower metal plate having a top surface and a bottom surface opposite the top surface, the top surface of the lower metal plate facing the bottom surface of the upper metal plate;
   an intermediate layer made of a filling material between the bottom surface of the upper metal plate and the top surface of the lower metal plate and bonded thereto;
   a frame extending peripherally around the intermediate layer; and at least one intermediate beam connected at one end to the top surface of the lower metal plate and at an opposite end to the bottom surface of the upper metal plate, the at least one intermediate beam spaced inwardly from the frame within a volume containing the intermediate layer.

2. The turbomachine base plate of claim 1, wherein the intermediate layer is made of a hardened flowable material.

3. The turbomachine base plate of claim 1, wherein the intermediate layer comprises a material selected from a group comprising: an unfoamed polymer, a polymer foam, a metal foam, a ceramic foam, or combination thereof.

4. The turbomachine base plate of claim 1, wherein the frame forms anchoring points to anchor the turbomachine base plate to a supporting structure.

5. The turbomachine base plate of claim 1, the frame further comprising outwardly extending flanges whereto anchoring members configured to couple the turbomachine base plate to a supporting structure are connected.

6. The turbomachine base plate of claim 1, wherein the frame is comprised of beams having a web and at least one outwardly projecting flange forming anchoring points for anchoring the turbomachine base plate to a supporting structure.

7. The turbomachine base plate of claim 1, further comprising turbomachine supporting elements connected to the top surface of the upper metal plate.

8. The turbomachine base plate of claim 1, wherein the upper metal plate has a thickness in the range of 1 to 50 mm, and/or the lower metal plate has a thickness in the range of 1 to 50 mm.

9. The turbomachine base plate of claim 1, wherein the intermediate layer has a thickness in the range of 100 to 1500 mm.

10. The turbomachine system of claim 1, further comprising an enclosure anchored to the frame of the base plate, extending above the upper metal plate and surrounding the gas turbine engine.

11. A method for producing a turbomachine system, comprising:
introducing a flowable material in a hollow volume of a base plate structure, the hollow volume formed among an upper metal plate having a top surface forming a turbomachine supporting surface and a bottom surface opposite the top surface, a lower metal plate having a top surface and a bottom surface opposite the top surface, the top surface of the lower metal plate facing the bottom surface of the upper metal plate; and a frame extending peripherally along edges of the upper metal plate and the lower metal plate, the hollow volume comprising at least one intermediate beam connected at one end to the top surface of the lower metal plate and at an opposite end to the bottom surface of the upper metal plate, the at least one intermediate beam spaced inwardly from the frame within the hollow volume;
causing the flowable material to flow and set in the hollow volume and adhere to the upper metal plate, the lower metal plate and the frame, and mounting a gas turbine engine on the base plate structure.

12. The method of claim 11, further comprising mounting turbine supporting elements on the outer surface of the upper metal plate.

13. The method of claim 12, further comprising mounting a gas turbine engine on the turbine supporting elements.

14. The method of claim 11, wherein the upper metal plate comprises a first plurality of metal plate components cumulatively forming the upper metal plate and the lower metal plate comprises a second plurality of metal plate components cumulatively forming the lower metal plate.

15. The method of claim 11, wherein the frame is comprised of a plurality of beams welded to one another in a quadrangular arrangement.

* * * * *